United States Patent Office 3,463,155
Patented Aug. 26, 1969

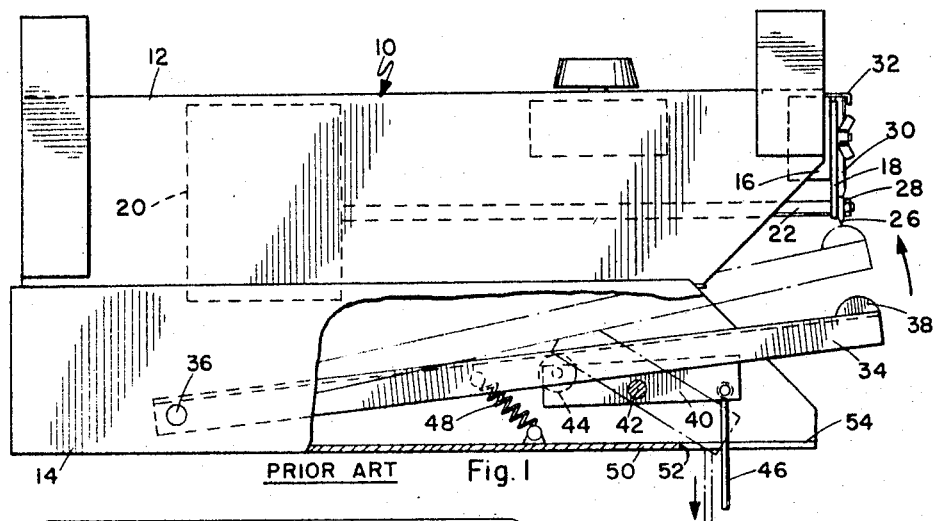
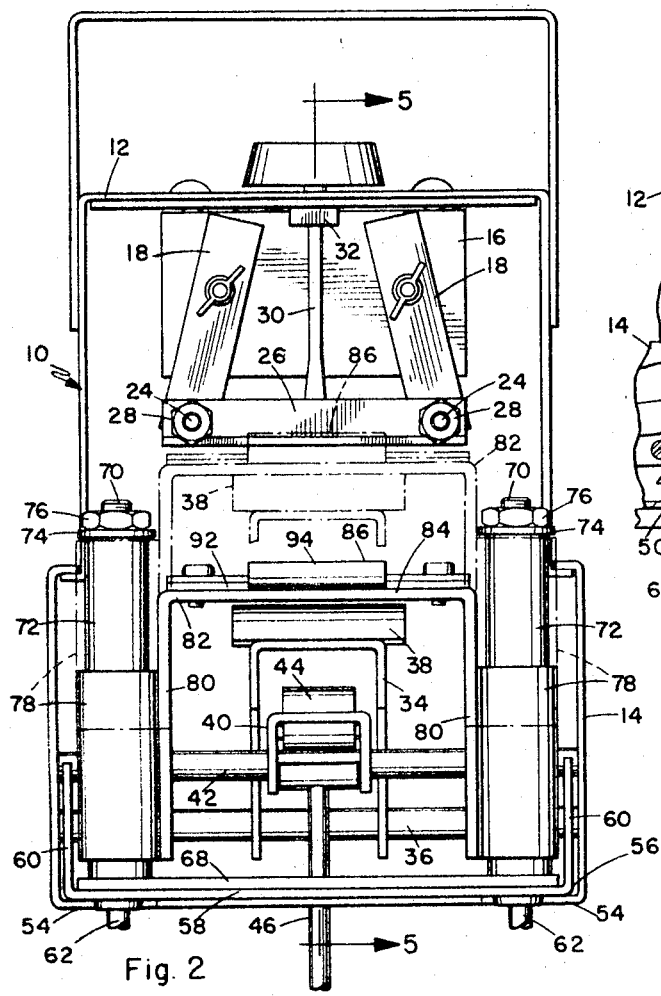
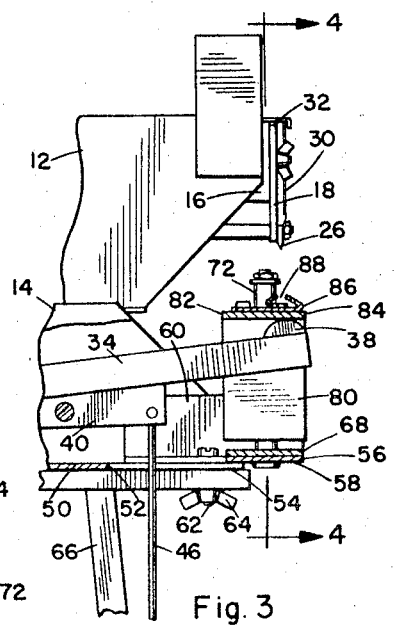

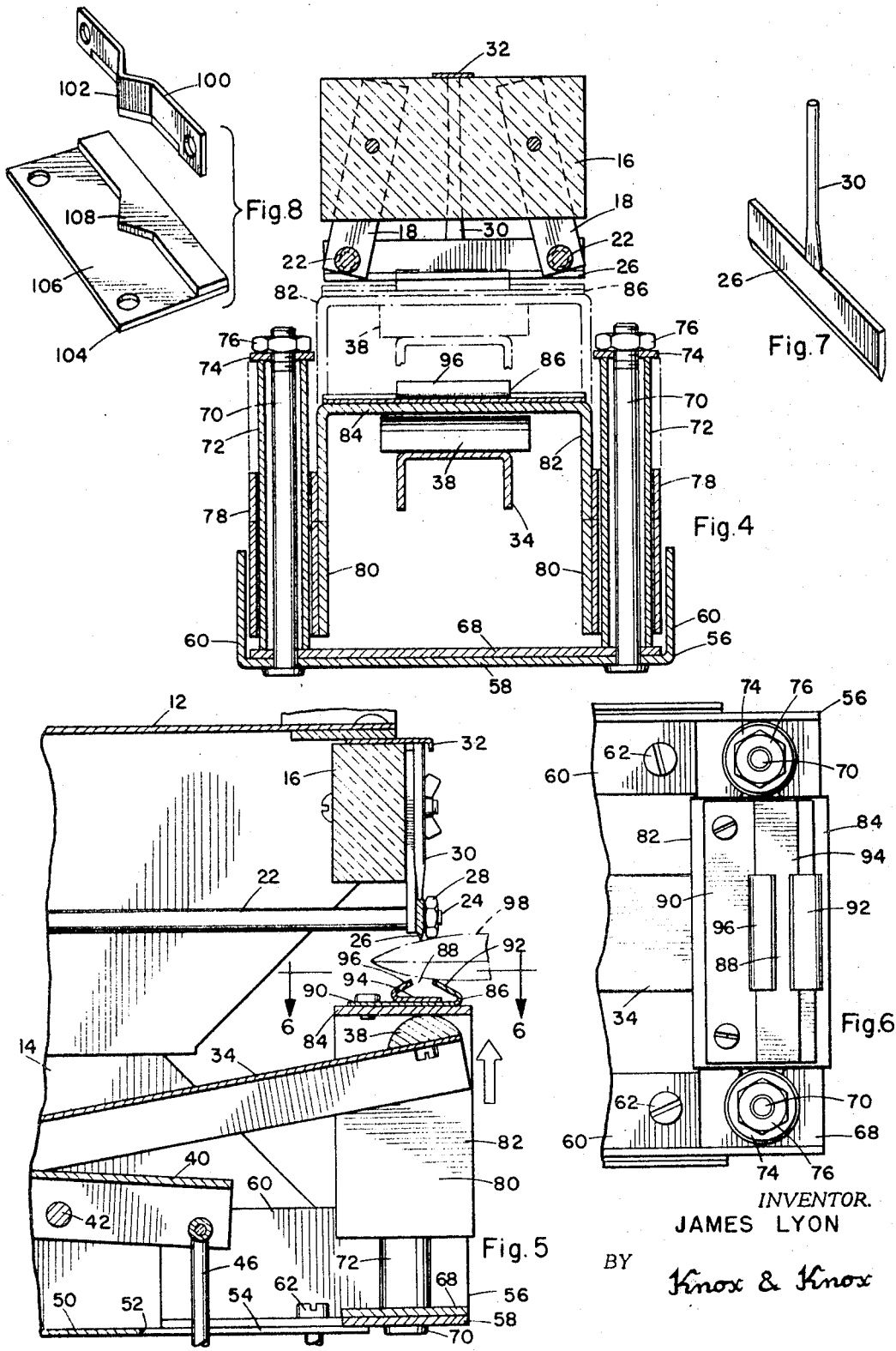

3,463,155
RECTILINEAR CUTTING ATTACHMENT FOR BEAK TRIMMER
James Lyon, 2922 Qualtraugh St., San Diego, Calif. 92106
Filed June 26, 1967, Ser. No. 648,687
Int. Cl. A61b 17/38, 17/32
U.S. Cl. 128—303.1                    4 Claims

ABSTRACT OF THE DISCLOSURE

An attachment for a machine for trimming beaks of chickens and other such birds, the machine having a fixed, heated cutting blade and a swinging anvil which moves in an arcuate path to force the beak against the blade, the attachment utilizing the existing anvil mechanism but converting the motion to a rectilinear stroke for more precise cutting and control of the cut.

BACKGROUND OF THE INVENTION

The present invention relates to farm equipment and specifically to a rectilinear cutting attachment for a beak trimming machine.

It is common practice to cut the beaks of chickens and other such birds to prevent cannibalism, feather picking and other nervous habits which can affect the well being of birds in a flock. The cutting is usually done by a machine using a heated blade to cauterize the cut, the bird being held with its beak in proper position on a support or anvil. The blade can be brought down against the anvil, or the anvil can be moved up against a fixed blade, the present attachment being adaptable to the latter type, an example of which is shown and described in U.S. Patent No. 2,742,904. Since the anvil is usually carried on a pivoted arm, the path of motion of the anvil is an arc about the pivotal axis, so the cut is not precisely square across the beak. For some purposes this arrangement is satisfactory but, for accurate cutting with a recessed anvil which allows the blade to pass squarely and completely through the beak, it is desirable to have a straight line or rectilinear motion of the anvil relative to the blade.

SUMMARY OF THE INVENTION

The attachment described herein is adaptable to existing beak trimming machines without modification to the basic structure and utilizes the original mechanical action. A simple frame unit is bolted to the basic machine and carries a vertically slidable anvil structure which is aligned acurately with the cutting blade, the existing swinging anvil engaging and moving the sliding anvil structure and so converting the motion from an arcuate to a rectilinear path. The slidable structure is easily adjustable to ensure free motion and prevent jamming. Various types of blades and matching anvil elements can be used according to the type of cut required and the attachment is easily removable at any time.

BRIEF DESCRIPTION OF THE DRAWINGS

FIGURE 1 is a side elevation view of the prior art machine, partially cut away to show the anvil action;

FIGURE 2 is an enlarged end elevation view, as taken from the right hand end of FIGURE 1, with the attachment in place;

FIGURE 3 is a view similar to a portion of FIGURE 1, with the attachment in place and shown in section;

FIGURE 4 is an enlarged sectional view taken on line 4—4 of FIGURE 3;

FIGURE 5 is a sectional view taken on line 5—5 of FIGURE 2;

FIGURE 6 is a view taken on line 6—6 of FIGURE 5;

FIGURE 7 is a perspective view of the cutting blade; and

FIGURE 8 is a perspective view of an alternative blade and anvil combination.

Similar characters of reference indicate similar or identical elements and portions throughout the specification and throughout the views of the drawings.

DESCRIPTION OF THE PREFERRED EMBODIMENT

The beak trimming machine shown in FIGURE 1 is of the type disclosed in the above-mentioned U.S. patent and will be described only in sufficient detail to support the new attachment structure. Numerous features of the machine may vary in detail, but the basic mechanical principle utilized herein will be essentially as shown.

The machine has a rectangular box-like casing 10 with an upper portion 12 and a lower portion 14. At the front end of upper portion 12 is an insulated block 16 on which are secured two downwardly extending support arms 18. Within the casing 10 is a power supply transformer 20 from which a pair of bus bars 22 extend to the lower ends of support arms 18, the bus bars having threaded ends 24 on which a resistance heated blade 26 is held by nuts 28. The blade as shown is rather long and may be given additional support by a central post 30 fixed to the blade and extending upwardly to a bracket 32 held between insulated block 16 and casing portion 12.

In the lower portion 14 is a longitudinal arm 34 pivotally held at its rear end on a transverse bearing pin 36 to swing vertically. Fixed on the forward end of arm 34 is an anvil 38, shown as a semicylindrical block, which moves into contact with the edge of blade 26 when the arm is raised. Below the forward portion of arm 34 is a rocker bar 40 pivoted intermediate its ends on a transverse pin 42, the rear end of the rocker bar carrying a freely rotatable roller 44 which engages the underside of said arm. Attached to the forward end of rocker bar 40 is a link 46, which may be a rod, chain, cable, or other such means and is connected to a foot pedal or the like (not shown) for operating the machine. When link 46 is pulled down, the rocker bar 40 rocks and raises arm 34, as in the broken line position in FIGURE 1, moving the anvil 38 upwardly to blade 26. Arm 34 is lowered by a return spring 48 between the arm and a convenient connection on the floor 50 of lower casing portion 14. From the positions shown in FIGURE 1 it will be evident that the path of the anvil is an arc and that the anvil is actually moving rearwardly as it approaches the blade. The forward end of floor 50 has a cutout 52 to provide clearance for link 46, the cutout leaving inwardly turned opposed flanges 54 on lower portion 14. The structure thus far described is conventional and may vary in detail.

The attachment is constructed on a channel-like frame 56 having a cross plate 58 and flanged side rails 60, which latter rest on and are secured to flanges 54 by bolts 62 and wing nuts 64. These bolts may also be used to secure the machine to a stand 66, shown fragmentarily in FIGURE 3, which is available to support the machine in working position. On top of cross plate 58 is a reinforcing plate 68 and extending upwardly through opposite ends of the double plate are two bolts 70. Fitted over the bolts 70 are cylindrical sleeves which form guide posts 72 and are held in place by washers 74 and nuts 76 at the upper ends of the bolts. Slidably mounted on guide posts 72 are sleeves 78, which are fixed to the side plates 80 of an inverted U-shaped saddle 82, the saddle being vertically slidable on the guide posts. By using guide posts having inside diameters somewhat larger than the bolts, as illustrated, the assembly is easily adjusted to ensure a free sliding fit for the sleeves by moving the guide posts eccentrically relative to the bolts. This reduces the necessity for extreme precision in manufacture, yet enables the sliding assembly to be set up for free operation without jamming and avoids the need for a return spring on the saddle element. Saddle 82 has a top plate 84 connecting side plates 80 and on the top plate is an anvil unit 86 with a slot 88 to receive the blade 26. As illustrated the anvil unit comprises a base plate 90 having a return folded flange 92 and an upper plate 94 with a return folded flange 96, the two flanges being opposed and spaced from each other to form slot 88. Other configurations may be equally suitable, but the slotted arrangement is preferable so that the blade will not be dulled by direct edge contact with the anvil.

The assembly is adjusted so that when the saddle 82 is raised the blade 26 will enter slot 88 easily. In the particular machine shown the upper and lower casing portions are longitudinally adjustable relative to each other to accommodate alignment of the blade and anvil, but adjustment could also be made possible by elongation of the holes for bolts 62.

When the machine is operated in the usual manner by pulling down on link 46, anvil 38 will engage the underside of saddle top plate 84 and lift the saddle assembly, causing anvil unit 86 to rise and meet blade 26. The arcuate motion of anvil 38 is thus converted into a straight vertical motion of anvil unit 86. When a bird's beak is held in place on anvil unit 86, as indicated in broken line at 98 in FIGURE 5, operation of the machine will cause the beak to be cut squarely.

If it is desired to make a V-shaped cut in the beak, as is often done in break trimming, the anvil and blade combination shown in FIGURE 8 may be used. The blade 100 has a V-shaped central portion 102 of the required configuration and is adapted to be held on the support arms 18 in the conventional manner. Anvil unit 104 comprises a base plate 106 on which is a thickened portion 108 conforming to the shape of blade 100, so that the blade will interfit with the thickened portion with a shearing action. The anvil unit 104 is mounted on the saddle 82 and operation is as described above, except that the bird's beak is held on its side to provide the required angular cut on the upper and lower mandibles. Other blade and anvil configurations are also readily adaptable to the machine and attachment.

No modifications are required to the basic machine to receive the attachment and operation of the machine is unchanged except for the cutting action. The attachment is adaptable to a variety of cutting elements and techniques and is readily removable if normal operation of the machine is required.

It is understood that minor variation from the form of the invention disclosed herein may be made without departure from the spirit and scope of the invention, and that the specification and drawings are to be considered as merely illustrative rather than limiting.

I claim:

1. A rectilinear cutting attachment for use on a beak trimming machine which has a casing, a fixed heated blade on an upper portion of said casing, an arm pivotally mounted in said casing to swing in a substantially vertical plane below said blade, an anvil on said arm remote from the pivotal axis thereof and positioned to engage said blade, and means to raise said arm and force said anvil against the blade in an arcute cutting stroke, the attachment comprising:

a frame secured to said casing below said blade;
an anvil unit vertically slidably mounted on said frame, said anvil unit being positioned above and engaged by the anvil of said machine and being moved into engagement with said blade in a rectilinear cutting stroke by upward motion of said arm.

2. The structure according to claim 1 wherein said anvil unit has a slot to receive said blade.

3. The structure according to claim 1 wherein said attachment includes spaced vertical guide posts on said frame, and a saddle member slidable on said guide posts, said anvil unit being fixed on said saddle member.

4. The structure according to claim 3 wherein said guide posts comprises bolts with sleeve elements thereon, said sleeve elements eccentrically adjustable on said bolts, whereby the effective spacing of the guide posts can be varied to achieve a smooth sliding fit of said saddle member.

References Cited

UNITED STATES PATENTS

| 2,384,875 | 9/1945 | Barton | 128—303.1 |
| 2,742,904 | 4/1956 | Lyon | 128—303.1 |

L. W. TRAPP, Primary Examiner

U.S. Cl. X.R.

128—305